United States Patent

[11] 3,593,569

| [72] | Inventor | Donald Malcolm Wilson<br>Linton, England |
|---|---|---|
| [21] | Appl. No. | 712,085 |
| [22] | Filed | Mar. 11, 1968 |
| [45] | Patented | July 20, 1971 |
| [73] | Assignee | S.T.D. Services Limited |

[54] ULTRASONIC TESTING APPARATUS
4 Claims, 5 Drawing Figs.

| [52] | U.S. Cl. | 73/67.7 |
|---|---|---|
| [51] | Int. Cl. | G01n 29/04 |
| [50] | Field of Search | 73/67.5–67.9 |

[56] References Cited
UNITED STATES PATENTS

| 3,052,115 | 9/1962 | Renant et al. | 73/67.5 |
|---|---|---|---|
| 3,285,059 | 11/1966 | Bogle | 73/67.9 |
| 3,373,602 | 3/1968 | Wendt et al. | 73/67.5 |

FOREIGN PATENTS

| 736,464 | 9/1955 | Great Britain | 73/67.9 |

*Primary Examiner*—James J. Gill
*Attorney*—Holman & Stern

ABSTRACT: Ultrasonic-testing apparatus in which a series of transducers are pulsed and scanned under the control of two ring counters, one controlling the pulsing sequence and the other controlling the scanning sequence, with a device for varying the phase relationship of the counters to vary the mode of testing.

INVENTOR
DONALD M. WILSON
BY
ATTORNEYS

ULTRASONIC TESTING APPARATUS

This invention relates to apparatus for testing tubes and other elongated workpieces for flaws by ultrasonics.

It is already known in this art to make use of testing arrangements utilizing a series of transducers situated around the periphery of the tube and to transmit pulses of ultrasonic energy sequentially from these transducers in a predetermined cycle. There are, however, various modes of ultrasonic testing which can be employed for detecting various types of flaws. In one mode the same transducer is used to transmit energy into the tube and then acts as a receiver for any energy reflected from a flaw. In an alternative mode a transmitter transducer and a receiver transducer are situated at circumferentially spaced positions. The sensitivity of this arrangement to various types of flaw can be varied by altering the relative circumferential positions of the transmitter and the receiver.

It is an object of the present invention to provide ultrasonic flaw detection apparatus which can be selectively utilized in the transceiving mode or in a variety of different modes in which the transmitter transducer and the receiver transducer in use at any given time are circumferentially spaced.

Apparatus in accordance with the invention comprises a plurality of transducers arranged so as, in use, to surround a tube to be tested, means adapted, when triggered, to energize the respective transducers to transmit ultrasonic waves, detector means arranged to receive signals from the respective transducers when ultrasonic waves are received thereby, timing means, a first sequence control means associated with said energizing means to trigger same sequentially in synchronism with said timing means, second sequence control means associated with said detector means effectively to connect said detector means to said transducers sequentially in synchronism with said timing means, and adjustable phase control means for adjusting the phase relationship of said first sequence control means relative to said second sequence control means whereby the first and second sequence control means may be operated in phase or one or more discrete steps out of phase.

Figure 1:
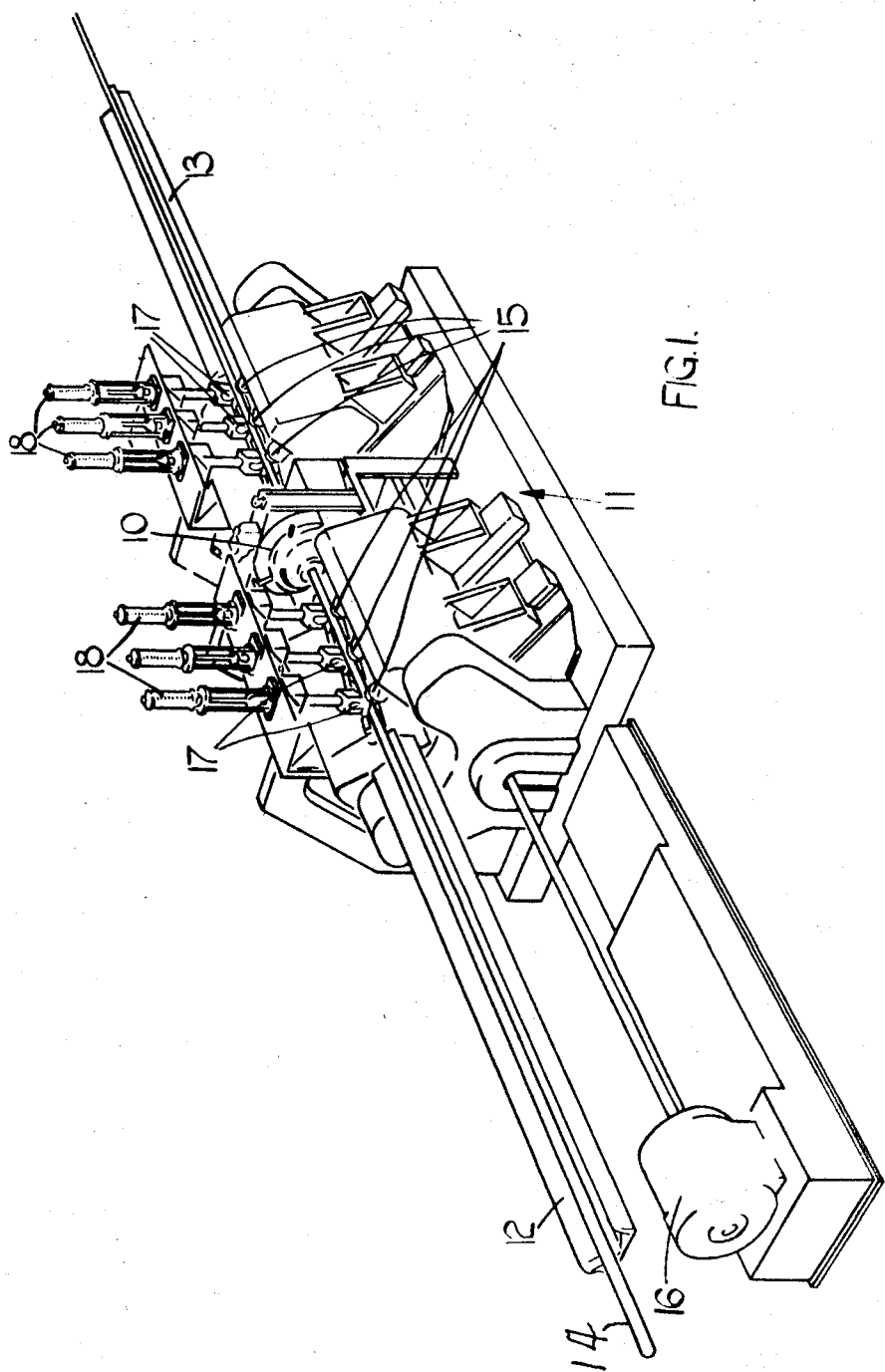
FIG. 1 is a perspective view of an example of ultrasonic-testing apparatus in accordance with the invention.

Referring to the drawings the apparatus includes a head 10 supported on a bed 11 incorporating a pair of aligned elongated troughs 12, 13 on opposite sides of the head 10. The bed also supports roller means for rotating and axially advancing a tube 14 carried thereby. Such roller means comprise a plurality of rollers 15 which are rotatable on axes skew to the tube axis and which are driven by a drive motor 16. The tube is held in contact with the rollers 15 by similar skewed idling rollers 17 thrust downwardly on to the tube by pneumatic cylinder units 18. The skewness of the rollers 15, 17 can be adjusted to suit tubes of different diameters.

Figure 2:
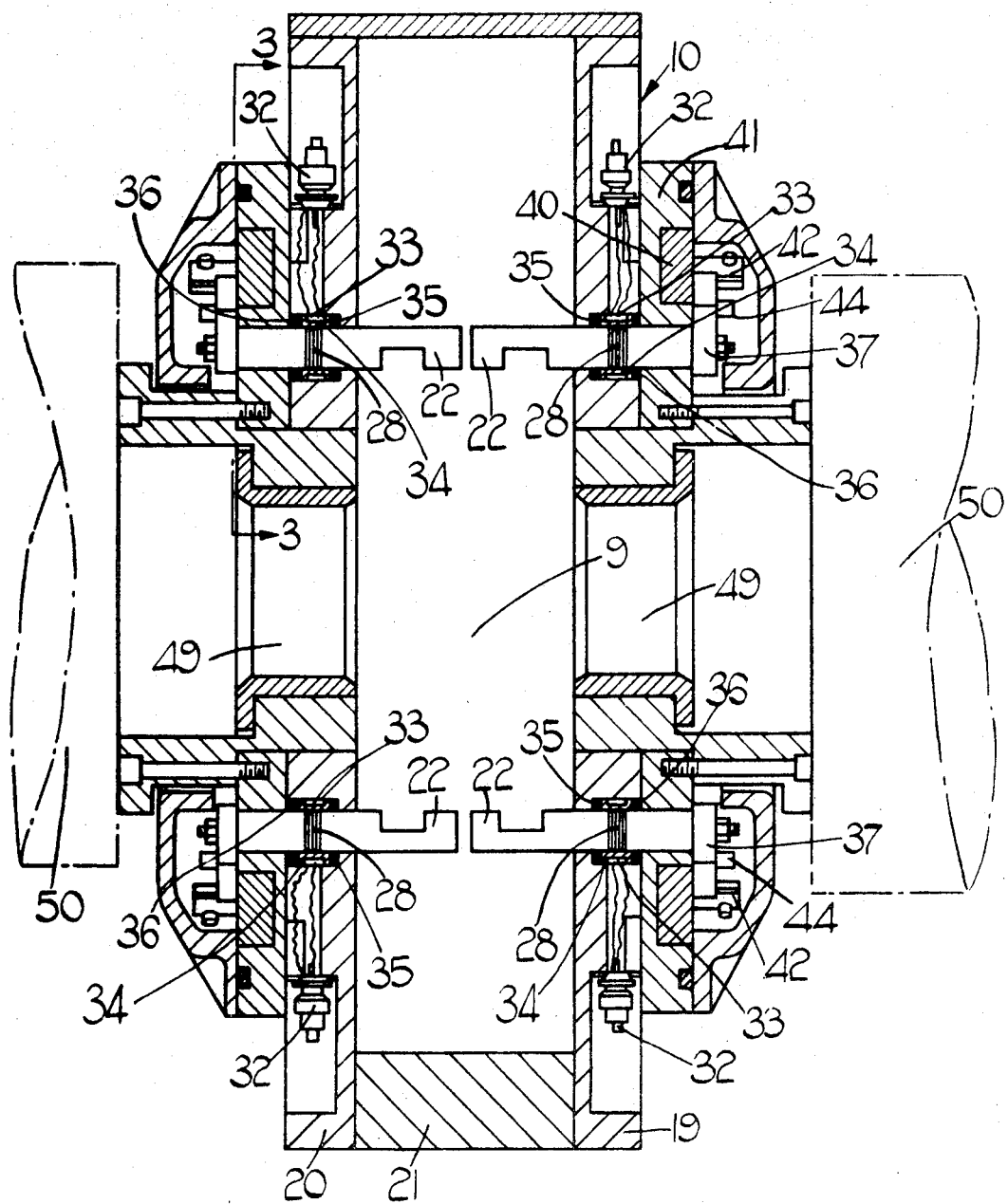
FIG. 2 is an enlarged section through a head forming a part of the apparatus.
Figure 4:
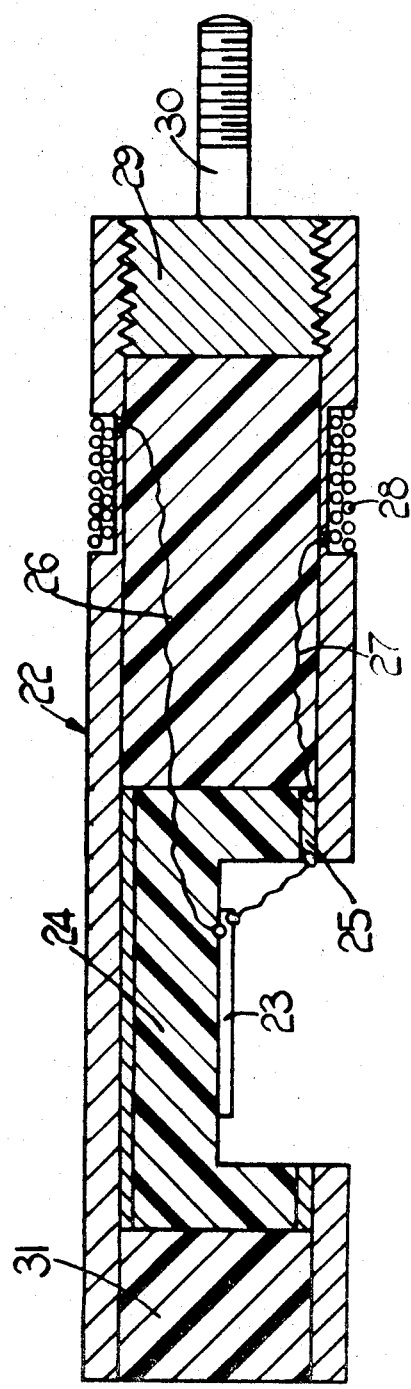
FIG. 4 is a still further enlarged fragmentary section on the line 4-4 in FIG. 3 of a single part of the head.

Turning now to FIG. 2 the head 10 consists basically of a pair of spaced parallel annular plates 19, 20 held apart by spacing means 21 to define a chamber 9 within the head. Extending into the chamber 9 from the plates 19, 20 are a plurality of pairs of probe carrier members 22. Looking at FIG. 4, it is seen that each carrier member 22 is cut away at a position intermediate its ends to reveal an ultrasonic transducer element 23. This transducer 23, which is in the form of lead zirconate crystal wafer silvered on both sides, is supported in a plane including the axis of the carrier member 22 so that a normal at the center of the transducer 23 is perpendicular to the axis of the carrier member 22. In addition the center point of each transducer 23 lies on the axis of the carrier member 22.

Each transducer 23 is actually supported on a backing 24 of tungsten powder-filled epoxy resin within a copper tube 25. The crystal 23 and the tube 25 are connected by leads 26, 27 to opposite ends of a coupling coil 28 wound in a groove in the extension of the carrier member 22 between the cutaway in which the crystal 23 is mounted and the adjacent end of the carrier member 22.

Each end of each carrier member 22 receives a plug 29 on which there is a threaded stem 30 coaxial with the carrier member 22. The interiors of the carrier members are filled with epoxy resin 31.

In the present example there are 24 pairs of the carriers 22 equiangularly spaced around the axis of the head 10. Mounted in recesses in the outer faces of the plates 19, 20 are 24 pairs of connectors 32 each of which is connected to a coil 33 associated with the appropriate end of an associated one of the carrier members 22. Each such coil 33 is carried by a spool 34 surrounding the coil 28 at the associated end of the carrier member 22 concerned. The spool 34 also serves to compress against the associated plate 19 or 20 an O-ring seal 35 which seals off the bore in the plate through which the carrier member 22 concerned passes. Another O-ring seal 36 is compressed against the opposite end of each spool 34.

Figure 3:
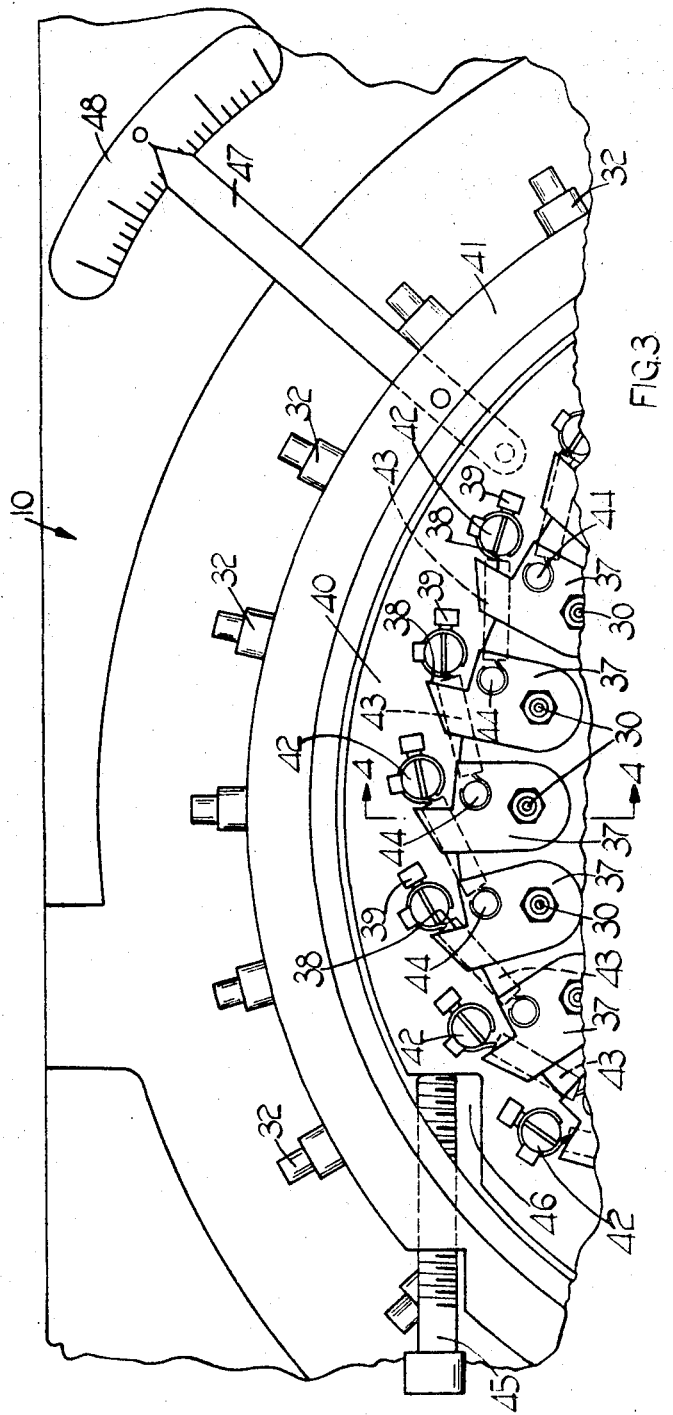
FIG. 3 is a further enlarged fragmentary section on line 3-3 in FIG. 2.

For angular adjustment of the carrier members 22 it will be seen in FIG. 3 that each member has attached to one of its ends, an arm 37 secured in position by means of the screwthreaded stem 30 on the carrier member 22. Each arm 37 has an abutment face 38 extending in an axial-radial plane with respect to the axis of the carrier. The arms 37 coact with adjustable abutments 39 on a ring member 40 mounted in an annular recess in a disc 41 secured to the plate 20. The abutments 39 are, in fact, screws engaged in cross bores in pegs 42 projecting from the ring member 40. The ring member 40 is angularly movable about the axis of the head 10. Coil springs 43 act between pegs 44 on the arms 37 and the pegs 42 to urge all the arms 37 in clockwise directions as viewed in FIG. 3, so as to keep the abutment faces 38 in contact with the abutment 39. The springs 43 (which are omitted for clarity from FIG. 2) also serve to urge the ring member 40 in an anticlockwise direction as viewed in FIG. 3.

An adjusting screw 45, engaged in a tapped bore in the disc 41, abuts one face of a notch 46 cut in the outer periphery of the ring member 40. Thus simultaneous, equal angular displacements of all the carrier members 22 associated with plate 19 or plate 20 can be effected by turning of screw 45 which causes angular displacement of the ring member 40. Adjustment of the individual carrier members 22 can be effected utilizing the adjustable abutments 39.

A pointer 47 pivoted to the disc 41 is connected by a pin and slot connection to the ring member 30 so as to be swung on angular movement of ring member 40 relative to the disc 41. The pointer coacts with a scale 48 to give a direct reading of the angle at which the aforementioned plane of the normal transducer on any carrier member 22 is inclined to a plane including the axes of the head and the carrier member concerned.

In use the chamber 9 of the head is kept full of water to act as a coupling medium for the ultrasonic waves passing between the transducers and the tube. A pair of guide bushes 49 guide the tube through the chamber 9 and these are associated with a pair of sealing devices 50 which minimize leakage of water from the chamber 9. These sealing devices 50 can be of various forms and their detailed construction is not relevant to the present invention.

Each coil 28 and the associated surrounding coil 33 forms a transformer coupling in the connection of the associated transducer 23 to a pulse source for energizing the transducer or to a detector for detecting ultrasonic waves received by the transducer. In the arrangement described all the transducers 23 act both as transmitting transducing and as receiving transducers at different stages of the cycle of operation.

Figure 5:
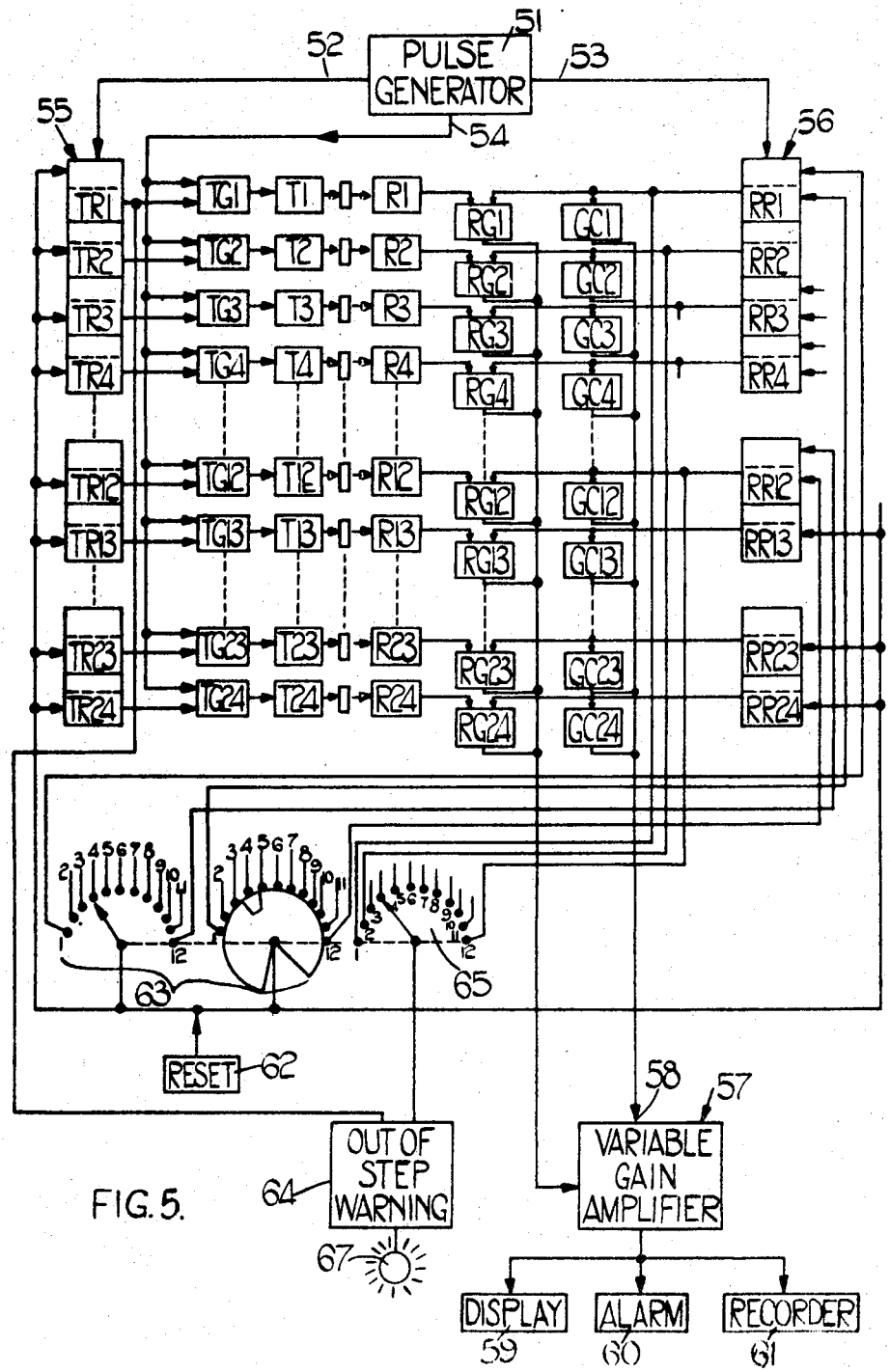
FIG. 5 is a schematic circuit in accordance with the invention.

FIG. 5 shows an arrangement by means of which the transducers 23 are caused to transmit ultrasonic waves sequentially and are simultaneously scanned. The following relates to the arrangement concerned with one set of 24 transducers 23, i.e. one transducer from each of the 24 pairs. The other 24 transducers have an identical arrangement, or a duplex time-sharing arrangement is employed. The arrangement is controlled by a master pulse generator 51 which has three output connections 52, 53, and 54. At the connections 52, and 53 symmetrical square wave forms, 1800° out of phase, are produced by the generator. At connection 54 a train of pulses commencing synchronously with the square waves at connection 52, but of short duration, are produced. The square wave form from connection 52 is used to drive a conventional ring counter 55 made up of individual bistable stages TR1, TR2....TR4. The ring counter 55 is, as is conventional, such that one of the stages TR1 to TR24 delivers an output at any time, each input signal received by the counter acting to cause the stage following the stage currently producing an output, to commence producing an output whereupon the previously conducting stage ceases to produce an output. Ring counters of this type are well known and detailed description thereof herein would thus be redundant.

The outputs of the individual stages TR1 to TR24 of the counter 55 are connected respectively to inputs of a bank of electronic AND gates TG1 to TG24. These gates also have input connections from the connection 54 of the generator 51 and are of any known form such that an output signal is only produced by a gate while signals are being received at both of its input terminals.

The output connections of the gates TG1 to TG24 are connected respectively to transmitter circuits T1 to T24 including one set of 24 of the transducers 23 and their associated transformer couplings 28, 33. Thus the transducers 23 are briefly energized at the commencement of each cycle of the square wave.

There is also a 24 stage receiver ring counter 56 driven by the square wave form derived from the connection 53 of the generator 51. The stages RR1 to RR24 of this ring counter are respectively connected to receiver gates RG1 to RG24 so as to control the passing of signals from receivers R1 to R24 respectively, each including a transducer 23 and the associated transformer coupling 28, 33 to an amplifier 57.

The amplifier 57 is of any convenient variable gain type with a gain control terminal 58 the magnitude of the voltage applied to which determines the gain of the amplifier. There are 24 gain control circuits GC1 to GC24 which are connected sequentially to the gain control terminal 58 under the control of the receiver ring counter 56. These gain control circuits are individually adjustable so that variations in the sensitivity of the individual transducer/gate circuit arrangements can be allowed for. The circuits GC1 to GC24 are adjusted when the apparatus is set up to ensure that the output from the amplifier 57 is the same for a given flaw echo irrespective of which transducer is in position to receive the echo from the flaw.

The amplifier 57 is connected to feed any convenient display 59, an alarm 60 and/or a recorder 61 which makes a permanent record of flaw signals received by the amplifier 57.

Adjustable phase control means are provided for adjusting the phase relationship of the two ring counters 55 and 56. To this end there is a manually actuable reset pulse circuit 62 (which may simply be a switch contact followed, if necessary by an amplifier) for delivering reset pulses to all the stages of the two ring counters. In the case of the ring counter 55 the reset circuit is connected to bias the stage TR1 into a state different from the remaining stages. In the case of counter 56 the stages RR13 to RR24 are connected direct to the reset circuit 62 to be biased to the same stage. The phase control means comprises a selector switch arrangement 63 which connects all except one of the stages RR1 to RR12 to the reset circuit 62 to be driven to the same state as the stages RR13 to RR24. The remaining stage is connected to be driven to the other state. It will be seen that by setting the selector 63 at any desired position it will be possible to make the two counters operate in phase (except for the lag of one half-cycle of the square wave form) or one to eleven steps out of phase.

For ensuring that the two counters are in phase or the desired number of steps out of phase there is a warning device 64 with one input connection from the output connection of the stage TR1 of the counter 55 and with another input connection from a selector switch 65 ganged with the selector switch arrangement 63. The switch 65 has connections to the outputs of the stages RR1 to RR12 of the counter 56. The warning device is such that a relay therein is actuated to light a lamp 67 if the selected output of the ring counter 56 does not produce a signal during the period when the stage TR1 of counter 55 is producing an output.

It will be noted that most of the connections between the selector switches 63, 65 and the stages RR1 to RR12 of the ring counter 56, are omitted for clarity, sufficient being shown to permit simple completion of the connections by anyone skilled in the art.

For operation the carrier members 22 are set up at angles determined by the diameter of the tube under test. Owing to the 180° phase lag of the square wave signal applied to the receiver ring counter 56 behind the square wave signal applied to the transmitter ring counter, the receiving transducers cannot pass signals to the amplifier until the emission of ultrasonic waves by the transmitting transducers has ceased. Thus the only significant signals received by the receiving transducers and passed by the receiver gates to the amplifier are waves actually rebounding from flaws within the wall of the tube.

The combination of the rapid scanning of the tube resulting from the sequential operation of the transmitter transducers and the sequential connection of the receiving transducers to the amplifier with the rotation of the tube as it is fed through the control passage in the head 10 ensures very complete coverage of the tube in the search for flaws therein. It is considered that each transmitter/receiver probe unit can effectively scan a portion of the periphery of the tube subtending an angle of 5° at the axis of the tube. Thus 72 probe units would be required for complete scanning of the periphery of the tube. In view of various size limitations, however, it has been found more convenient for the tube to be rotated to allow fewer probe units to be employed. With the 24 units employed in the example described a tube of up to two inches outer diameter could be fed through the head 10 at a speed of the order of 180 feet per minute if flaws up to one-half inch length and less can be tolerated, whilst it is rotated at a rate in the region of 240 revolutions per minute. The tube rotates through one complete revolution for each three complete cycles of the ring counters.

I claim:

1. Apparatus for testing elongated workpieces for flaws by ultrasonics comprising a plurality of transducers arranged so as to surround a workpiece to be tested; a plurality of energizing means associated with the respective transducers and adapted, when triggered, to energize the respective transducers to transmit ultrasonic waves; detector means arranged to receive signals from the respective transducers when ultrasonic waves are received thereby; timing pulse generator means for generating a pulse train; first sequence control means associated with said energizing means and connected to the pulse generator means to trigger said energizing means sequentially on receipt of successive pulses from the pulse generator means; second sequence control means associated with said detector means and connected to the pulse generator means to effectively connect said detector means to said transducers sequentially on receipt of successive pulses from the pulse generator means; and an adjustable phase control means for adjusting the phase relationship to said first sequence control means relative to said second sequence control means causing said first and second sequence control means to be selectively operated in phase or in one or more discrete steps out of phase.

2. Apparatus as claimed in claim 1 in which said first and second sequence control means comprise two ring counters each constituted by a plurality of bistable stages cross-connected so that one stage is in a different stable state from the remaining stages; said phase control means includes a reset circuit for resetting said ring counters, said reset circuit being connected in a predetermined manner to one counter and containing a selector switch connecting said reset circuit to the other counter whereby, on actuation of said reset circuit a predetermined one of the stages of said one ring counter is driven into said different state, whereas a selected one of said stages of said other ring counter is driven into said different state.

3. Apparatus as claimed in claim 2 further comprising a warning device connected to the output of said predetermined one of the stages of said one counter and to the outputs of a plurality of the stages of said other counter through means sensitive to the position of the selector switch to indicate if the desired phase relationship has not been attained.

4. Apparatus as claimed in claim 1 further comprising a housing having a passage therethrough for receiving a workpiece for testing; a plurality of transducer carriers on which the transducers are respectively mounted, said transducer carriers being pivotable about axes parallel to said passage; and means for simultaneously adjusting all of said carriers about said pivotal axes.